United States Patent [19]

Mullis

[11] Patent Number: 4,524,618
[45] Date of Patent: Jun. 25, 1985

[54] GLASS SIGHT GAUGE FOR HIGH PRESSURE VESSEL

[76] Inventor: H. Leon Mullis, 1701 W. Easton Ct., Tulsa, Okla. 74127

[21] Appl. No.: 585,389

[22] Filed: Mar. 2, 1984

[51] Int. Cl.$^3$ .............................................. G01F 23/02
[52] U.S. Cl. ..................................... 73/323; 116/227
[58] Field of Search ................. 73/323, 324, 325, 326, 73/327, 328, 329, 330, 334; 116/227, 276; 33/178 C; 285/DIG. 12

[56] References Cited

U.S. PATENT DOCUMENTS

| | | | |
|---|---|---|---|
| 630,047 | 8/1899 | Gilbert | 73/328 |
| 942,365 | 12/1909 | Buckner | 73/327 |
| 1,159,764 | 11/1915 | Heller | 73/328 |
| 2,725,844 | 12/1955 | Wittlin | 73/325 |
| 3,455,163 | 7/1969 | Lukas et al. | 73/328 |

Primary Examiner—Steven L. Stephan
Assistant Examiner—Patrick Scanlon
Attorney, Agent, or Firm—Head, Johnson & Stevenson

[57] ABSTRACT

A tubular sight gauge with improved high pressure sealing characteristics comprising a conventional pyrex tube held in a gauge housing wherein each end is sealed by use of a stainless steel tube ring that concentrically sleeves around the glass tube with an internal shoulder that rests, on one side, directly against an abrupt change in internal diameter of the end openings in the gauge housing and has an O-ring on the other side of said shoulder and wherein each end of the glass tube is held within the opening by tube spacers (e.g., concentric plastic deformable spacers) such as to limit longitudinal movement (e.g., to approximately 1/16 inch). Such a tubular sight gauge exhibits the ability to maintain a hydraulic seal at pressures approaching 8,000 psi.

3 Claims, 3 Drawing Figures

GLASS SIGHT GAUGE FOR HIGH PRESSURE VESSEL

BACKGROUND OF THE INVENTION

1. Field of the Invention

This invention relates to a glass sight gauge for high pressure vessels. More specifically, this invention relates to sealing a cylindrical glass liquid level gauge to be used with liquid storage vessels containing a liquid under high pressure.

2. Description of the Prior Art

The basic concept of employing a vertical glass tube or glass windowed device attached to the outside of a liquid storage vessel to visually determine the liquid level within the container is generally known. It is further recognized that as the pressure of the vessel increases, conventional glass sight tubes ultimately fail (loss of seal or catastrophic failure). This is attributed to the build up of stress associated with pressuring up the vessel and sight gauge. The problem is further aggravated in situations involving storage of a high temperature liquid because of temperature gradient and dissimilar thermal expansion contributions to stress and lack of sealing around the glass tube.

SUMMARY OF THE INVENTION

In view of the problems associated with the prior art glass sight tubes, I have discovered an improved high pressure tubular sight gauge comprising:

(a) an elongated gauge housing adapted to attach to the exterior of a vessel wherein the gauge housing contains a cylindrical opening passing longitudinally through the gauge housing and wherein the cylindrical opening is characterized by a larger diameter at each end of the gauge housing than in the middle thus defining larger diameter regions at each end and a smaller diameter region therebetween wherein said smaller diameter region of the opening is adapted to accept a glass sight tube or element (b) and wherein the large diameter regions are in fluid communication with the interior of the vessel and wherein the cylindrical opening is further characterized by abruptly tapering down to the smaller diameter slightly larger than the glass sight tube in a region displaced inward from each end of the gauge housing and wherein at least one side of the gauge housing, substantially between the regions of abrupt change in diameter, is open thus visually exposing a significant portion of the glass sight tube;

(b) a glass sight tube within the cylindrical opening in the elongated gauge housing wherein the glass sight tube extends from substantially within the large diameter region at one end of the gauge housing through the smaller diameter region including passing through the regions of abrupt change in diameter and visual side opening therebetween terminating substantially within the larger diameter region of the other end;

(c) a pair of tube rings concentrically positioned on the glass sight tube substantially near each end of the sight tube such as to extend from within the larger diameter region through the region of abrupt diameter change and substantially into the side opening of the gauge housing and wherein each of the tube rings contain a rigid concentric shoulder on the outermost end of said tube ring that occupy the space between the outside diameter of the glass sight tube and the inside diameter of the larger diameter region and wherein each of the rigid concentric shoulders makes contact with the region of abrupt change in diameter on one side and make contact with an O-ring of element (d) on the other side;

(d) a pair of O-rings each seated against the rigid concentric shoulder on one of the tube rings and occupying the space between the outside diameter of the glass sight tube and the larger diameter region;

(e) a pair of end caps each sealing the larger diameter openings at each end of the gauge housing; and (f) a pair of tube spacers each in contact with the end of the glass sight tube or the end cap such as to limit the longitudinal movement of the glass sight tube within the cylindrical opening in the elongated glass housing and wherein the tube spacers are adapted to allow for fluid communication between the larger diameter region and the interior of the glass sight tube.

According to the preferred embodiment of the present invention, the openings at the end of the gauge housing are internally threaded and the end caps are correspondingly threaded plugs with O-ring seals. Preferably, the tube rings are made of stainless steel and the tube spacers are plastic.

It is an object of the present invention to provide a cylindrical, liquid level determining, glass sight tube which can be employed at high pressures. It is an additional object of the present invention to provide a novel apparatus for making a seal at each end of a glass sight tube that compensates for stress created at high pressures and elevated temperatures, thus maintaining a liquid seal under such conditions. Fulfillment of these objects and the presence and fulfillment of additional objects will be apparent upon complete reading of the specification and claims taken in conjunction with the attached drawings.

DESCRIPTION OF THE PREFERRED EMBODIMENTS

The improved tubular sight gauge according to the present invention, how it functions, how it differs from the prior art devices and the advantages associated with its use can perhaps be best explained and understood by reference to the drawings.

Figure 1:
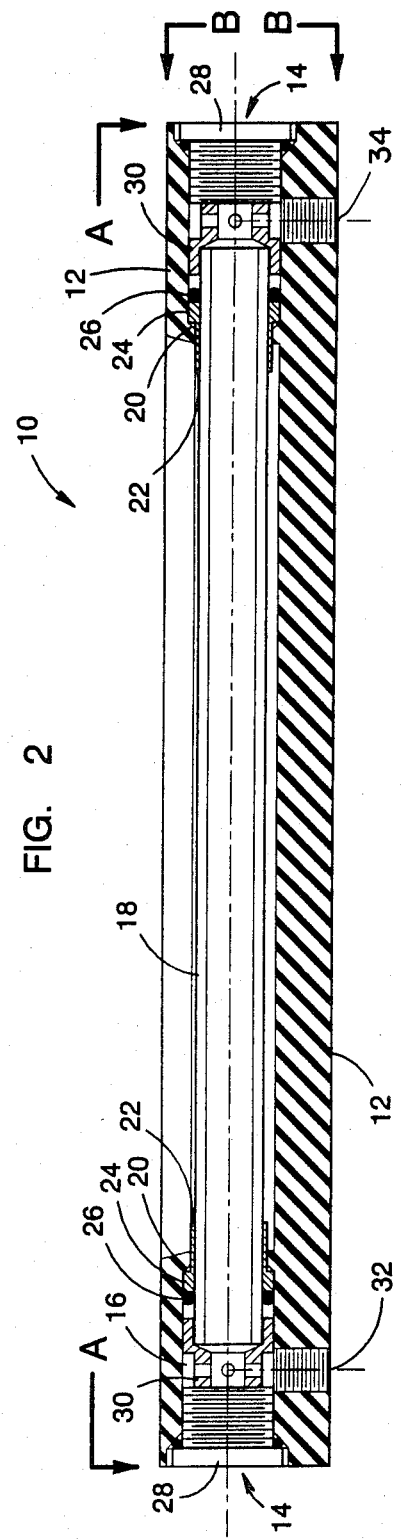
FIG. 1 is a partial cut-away side view of a high pressure, glass tubular sight gauge according to the present invention.

FIG. 1 illustrates a partial cross-sectional view of a glass tubular sight gauge for high pressure use according to the present invention, generally designated by the numeral 10.

As illustrated, the tubular sight gauge 10 consists of a gauge housing 12 preferably manufactured or machined from a single piece or block of steel or other appropriate structural metal. This elongated gauge housing 12 is traversed by a cylindrical opening 14 passing longitudinally through the entire housing structure. The cylindrical opening 14 involves a relatively large diameter opening 16 at each end of the gauge housing 12 which abruptly tapers to a diameter that is just slightly larger than the diameter of the glass tube 18 inserted through cylindrical opening 14. The abrupt changes in diameter occur in regions 20 displaced inwardly from each end of the gauge housing 12. The top or front (see FIG. 2) portion of the gauge housing 12, between the regions 20 of restricted diameter, is machined or removed such as to expose a substantial portion of the glass tube 18 to the observer or party reading the liquid level.

Figure 2:
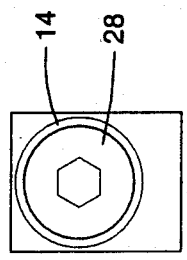
FIG. 2 is an end view of the tubular sight gauge of FIG. 1 as seen through line B—B.

As further illustrated in FIGS. 1 and 2, the glass tube 18 as it passes through the regions 20 of abrupt change in diameter is sleeved with a pair of tube rings 22. Each tube ring 22 has a concentric shoulder 24 on the larger diameter side of the opening 14 which rests on one side of the region 20 of abrupt change in diameter. On the other side of the tube ring shoulder 24 is an O-ring 26 which essentially occupies the annular space between the outer surface of the glass tube 18 and the inner diameter of the large diameter ends of opening 14.

Figure 3:
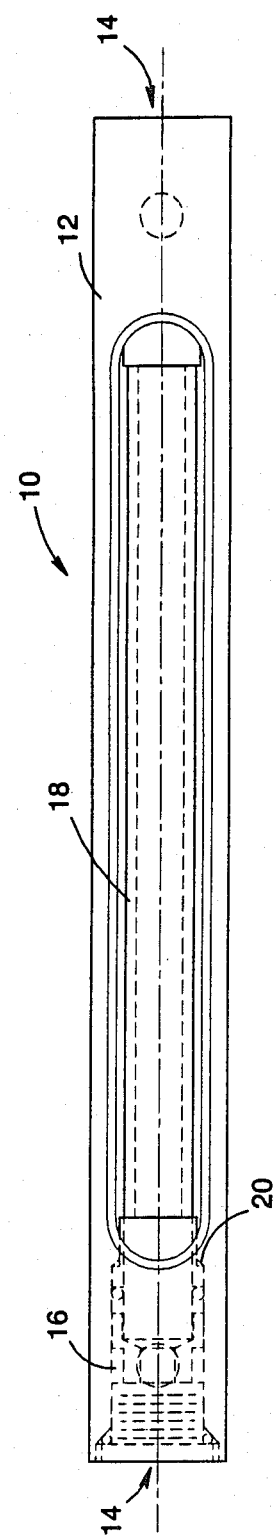
FIG. 3 is a top or frontal view of the tubular sight gauge of FIG. 1 as seen through line A—A and as observed by the user when reading the liquid level.

As further illustrated in FIG. 1, the glass tube 18 terminates within the larger diameter region of the opening 14 substantially short of the end plugs 28 (see FIG. 3). Each end of the glass tube 18 is equipped with a tube spacer 30 that concentrically engages the end of the glass tube 18 and occupies the annular space between the outer surface of the glass tube 18 and the larger diameter region of the opening 14. The tube spacers 30 further extend toward the respective ends of the gauge housing 12 such as to limit the longitudinal movement of the glass tube 18 within the opening 14 to approximately 1/16 inch.

The sight gauge 10 is further equipped with, in this specific embodiment, a pair of threaded openings 32 and 34 which are used to attach the gauge 10 to a vessel and are also employed to establish fluid communication between the interior of the storage vessel or tank and the large diameter end cavities 16. The tube spacers 30 within the larger diameter region of the gauge 10 are perforated such as to allow for fluid flow through the sight glass tube 18. In this manner, the gauge 10 can be mounted vertically on the outside of a liquid storage vessel and the interior liquid level will be visually observed within the glass tube 18.

In order to assemble and use the tubular sight gauge according to the present invention, the glass tube is merely inserted through the elongated opening in the gauge housing. The tube rings are then sleeved over the glass tube such that they extend into the visible portion of the glass tube. A pair of O-rings are then positioned on the glass tube and the tube spacers are slipped onto the ends of the tube followed by threading the pair of end caps with O-rings into the opening. The selection of material to be employed in the construction of the sight gauge according to the present invention can be generally any material compatible for such purposes as well known in the art. Of course, all components should be selected as being compatible with the particular liquid and conditions being employed during storage of that liquid. Preferably, the tube spacers are to be manufactured from a chemically resistant grade of plastic such as a polyolefin (e.g., polyethylene, polypropylene and the like), nylon, polytetrafluorethylene, polyimides (particularly for ultra-high temperature applications) and the like. The tube ring member with concentric shoulder should be made of metal or the equivalent, preferably stainless steel is used. The glass tube is preferably a high strength, high temperature glass tube such as pyrex.

The advantages associated with the use of the tubular sight gauge according to the present invention are numerous. The device is relatively simple in design, use and ease of installation. It is amenable to contemporary manufacturing techniques using commercially available materials. It can be made in a variety of sizes and shapes. And, the improved ability to maintain a seal at high pressure is felt to be principally attributed to the novel structure of the tube spacer and tube ring sealing mechanism. By using the combination of a pair of tube spacers that inherently center the glass tube both concentrically and longitudinally within the opening, yet compensate for dissimilar expansion and contraction relative to the gauge housing and a pair of tube rings that allow the glass and O-ring seals to slide during expansion or contraction of the glass tube, extraordinary high pressure sealing about the glass tube is achieved. Again, experience indicates that the sight gauge according to the present invention, made from a conventional pyrex tube, can maintain a seal at 8,000 psi.

Having thus described the preferred embodiments with a certain degree of particularity, it is manifest that many changes can be made in the details of the invention without departing from the spirit and scope of the invention. Therefore, it is to be understood that the invention is not limited to the embodiments set forth herein for purposes of exemplification, but is to be limited only by the scope of the attached claims, including a full range of equivalents to which each element thereof is entitled.

I claim:

1. A tubular sight gauge comprising:
   (a) an elongated gauge housing adapted to attach to the exterior of a vessel wherein said gauge housing contains a cylindrical opening passing longitudinally through said gauge housing and wherein said cylindrical opening is characterized by a larger diameter at each end of said gauge housing than in the middle thus defining larger diameter regions at each end and a smaller diameter region therebetween wherein said smaller diameter region of said opening is adapted to accept a glass sight tube of element (b) and wherein said large diameter regions are in fluid communication with the interior of the vessel and wherein said cylindrical opening is further characterized by abruptly tapering down to said smaller diameter slightly larger than the glass sight tube in a region displaced inward from each end of said gauge housing and wherein at least one side of said gauge housing, substantially between said regions of abrupt change in diameter, is open thus visually exposing a significant portion of the glass sight tube;
   (b) a glass sight tube within said cylindrical opening in said elongated gauge housing wherein said glass sight tube extends from substantially within said large diameter region at one end of said gauge housing through said smaller diameter region including passing through said regions of abrupt change in diameter and visual side opening therebetween terminating substantially within said larger diameter region of said other end;
   (c) a pair of tube rings concentrically positioned on said glass sight tube substantially near each end of said sight tube such as to extend from within said larger diameter region through said region of abrupt diameter change and substantially into said side opening of said gauge housing and wherein each of said tube rings contain a rigid concentric shoulder on the outermost end of said tube ring that occupy the space between the outside diameter of said glass sight tube and the inside diameter of of the larger diameter region and wherein each of said rigid concentric shoulders makes contact with said region of abrupt change in diameter on one side and makes contact with an O-ring of element (d) on the other side;

(d) a pair of O-rings each seated against said rigid concentric shoulder on one of said tube rings and occupying the space between the outside diameter of said glass sight tube and the larger diameter region;

(e) a pair of end caps each sealing the larger diameter openings at each end of said gauge housing; and (f) a pair of tube spacers each in contact with the end of said glass sight tube of said end cap such as to limit longitudinal movement of said glass sight tube within said cylindrical opening in said elongated gauge housing and wherein said tube spacers are adapted to allow for fluid communication between said larger diameter region and the interior of said glass sight tube.

2. A tubular sight gauge of claim 1 wherein said larger diameter regions are internally threaded at the end of said gauge housing and said end caps are plugs with O-ring seals.

3. A tubular sight gauge of claim 2 wherein said tube rings are stainless steel and said tube spacers are plastic.

* * * * *